(12) United States Patent
Allen et al.

(10) Patent No.: US 7,963,117 B2
(45) Date of Patent: Jun. 21, 2011

(54) DC-POWERED HVAC SYSTEM

(75) Inventors: Kendall Allen, Emporia, VA (US);
Ralph G. Bailey, Richmond, VA (US)

(73) Assignee: Dometic Corporation, Elkhart, IN (US)

( * ) Notice: Subject to any disclaimer, the term of this patent is extended or adjusted under 35 U.S.C. 154(b) by 814 days.

(21) Appl. No.: 11/417,412

(22) Filed: May 4, 2006

(65) Prior Publication Data

US 2006/0248907 A1 Nov. 9, 2006

Related U.S. Application Data

(60) Provisional application No. 60/677,555, filed on May 4, 2005.

(51) Int. Cl.
*F25B 39/04* (2006.01)
*F25B 29/00* (2006.01)
*F25B 13/00* (2006.01)
*F25B 41/00* (2006.01)
*F25B 27/00* (2006.01)
*G05D 23/32* (2006.01)

(52) U.S. Cl. .......... 62/184; 62/157; 62/158; 62/159; 62/160; 62/238.4; 62/238.7; 62/203

(58) Field of Classification Search .............. 62/184, 62/157, 158, 159, 160, 238.4, 238.7, 239, 62/203
See application file for complete search history.

(56) References Cited

U.S. PATENT DOCUMENTS

| 5,144,812 | A | * | 9/1992 | Mills et al. ............... 62/186 |
| 5,255,529 | A | * | 10/1993 | Powell et al. ............. 62/180 |
| 5,396,779 | A | * | 3/1995 | Voss ...................... 62/196.2 |
| 5,899,081 | A | | 5/1999 | Evans et al. |
| 6,889,762 | B2 | | 5/2005 | Zeigler et al. |
| 6,935,130 | B2 | * | 8/2005 | Cheng et al. ............. 62/259.2 |
| 2002/0157413 | A1 | | 10/2002 | Iwanami et al. |
| 2003/0106332 | A1 | | 6/2003 | Okamoto et al. |
| 2003/0201097 | A1 | * | 10/2003 | Zeigler et al. ............. 165/240 |
| 2004/0168449 | A1 | | 9/2004 | Homan |

FOREIGN PATENT DOCUMENTS

EP 1524137 A 4/2005

OTHER PUBLICATIONS

European Search Report dated Jul. 27, 2006.

* cited by examiner

*Primary Examiner* — Thomas E Denion
*Assistant Examiner* — Michael Carton
(74) *Attorney, Agent, or Firm* — Pearne & Gordon LLP

(57) ABSTRACT

An HVAC system for a motorized vehicle or vessel is provided that includes a variable-speed compressor, a variable-speed condenser fan and a variable-speed evaporator fan. The HVAC system further includes a DC-power system for supplying DC power to the variable-speed compressor, the variable-speed condenser fan and the variable-speed evaporator fan regardless if the mobile unit's engine is operating or not operating. A controller and an operator interface are also provided for controlling the operation of the HVAC system.

6 Claims, 3 Drawing Sheets

DC-POWERED HVAC SYSTEM

This application claims the benefit of U.S. Provisional Patent Application No. 60/677,555 filed on May 4, 2005, which is incorporated herein by reference.

FIELD OF THE INVENTION

The present invention relates to heating, ventilating and air conditioning ("HVAC") systems and more specifically to a DC-powered HVAC system for use with motorized vehicles.

BACKGROUND OF THE INVENTION

HVAC systems are typically provided on motorized vehicles such as trucks, busses, motor homes, etc. and vessels such as boats, ships, etc. (hereinafter collectively referred to as "mobile units"). During operation of the mobile unit the HVAC system is powered by the energy produced by the mobile unit's engine(s). The HVAC system, however, cannot operate during periods when the mobile unit is not in operation and the engine is turned off. Thus, while the operator of the mobile unit is resting he or she has the choice of either letting the engine idle in order to run the HVAC system and maintain a comfortable environment inside the mobile unit or turn off the engine and rest in a less than desirable environment. Regarding the former choice, idling the engine to maintain a comfortable environment for the operator is not desired for several reasons. For example, idling the engine during rest periods increases the operating costs of the mobile unit, increases the wear and tear on the engine and associated components, increases undesirable emissions, etc. Regarding the latter choice, the operator may not be able to achieve optimum rest due to extreme temperatures, thus, increasing the safety risk during operation of the mobile unit. There are circumstances where there are independent-external power sources available to allow the operator to power the HVAC system without idling the engine. These external power sources, however, are not always available. Thus, what is required is an HVAC system that can operate with or without the idling of the mobile unit's engine.

HVAC systems for mobile units that can operate with or without the mobile unit's the idling of the mobile unit's engine are generally known. Further, DC-powered HVAC systems are also generally known. Increasing the efficiency and maximizing the operating capacity of the DC-power, however, remains an interest in improvements in these systems. These improvements can be realized by utilizing variable-speed components such as a variable-speed compressor, a variable-speed condenser fan and a variable-speed evaporator fan. Thus, what is required is variable-speed-DC-powered HVAC system.

BRIEF SUMMARY OF THE INVENTION

In accordance with one aspect, an HVAC system for a mobile unit having an engine is provided comprising a variable-speed environmental-control unit for controlling the environment in a space within the mobile unit further comprising a DC-power system for supplying DC power to the environmental-control unit while the mobile unit's engine is not operating and a controller for controlling the operation of the variable-speed-environmental-control unit and the DC-power system.

In accordance with another aspect of the invention a variable-speed HVAC system for a mobile unit having an engine is provided comprising a variable-speed compressor, a variable-speed evaporator fan, a controller for controlling the operation of the variable-speed HVAC system, a first DC-power source having a DC battery to start the mobile unit's engine, and a second DC-power source having a DC battery connected to the first DC-power source where the second DC-power source provides DC power to the variable-speed compressor and the variable-speed evaporator fan when the mobile unit's engine is not operating.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, an example embodiment of which will be described in detail in this specification and illustrated in the accompanying drawings that form a part of the specification.

DETAILED DESCRIPTION OF THE INVENTION

Described herein, according to an example embodiment of the invention, is an HVAC system for use on a motorized mobile unit adapted to operate when the mobile unit's engine is either running or not running. The term "mobile unit" as used herein includes vehicles having engines such as trucks, busses, motor homes, etc. and vessels having engines such as boats, ships, etc. The term "HVAC system" as used herein refers generally to an environmental-control unit for controlling an environment, which includes heating, cooling, ventilating, air handling, humidifying, dehumidifying, etc. in a controlled environmental space within the mobile unit. The controlled environmental space may include an operating portion, where an operator resides when the mobile unit is operational, and a sleeping portion where the operator rests when the mobile unit is not operational.

Figure 1:
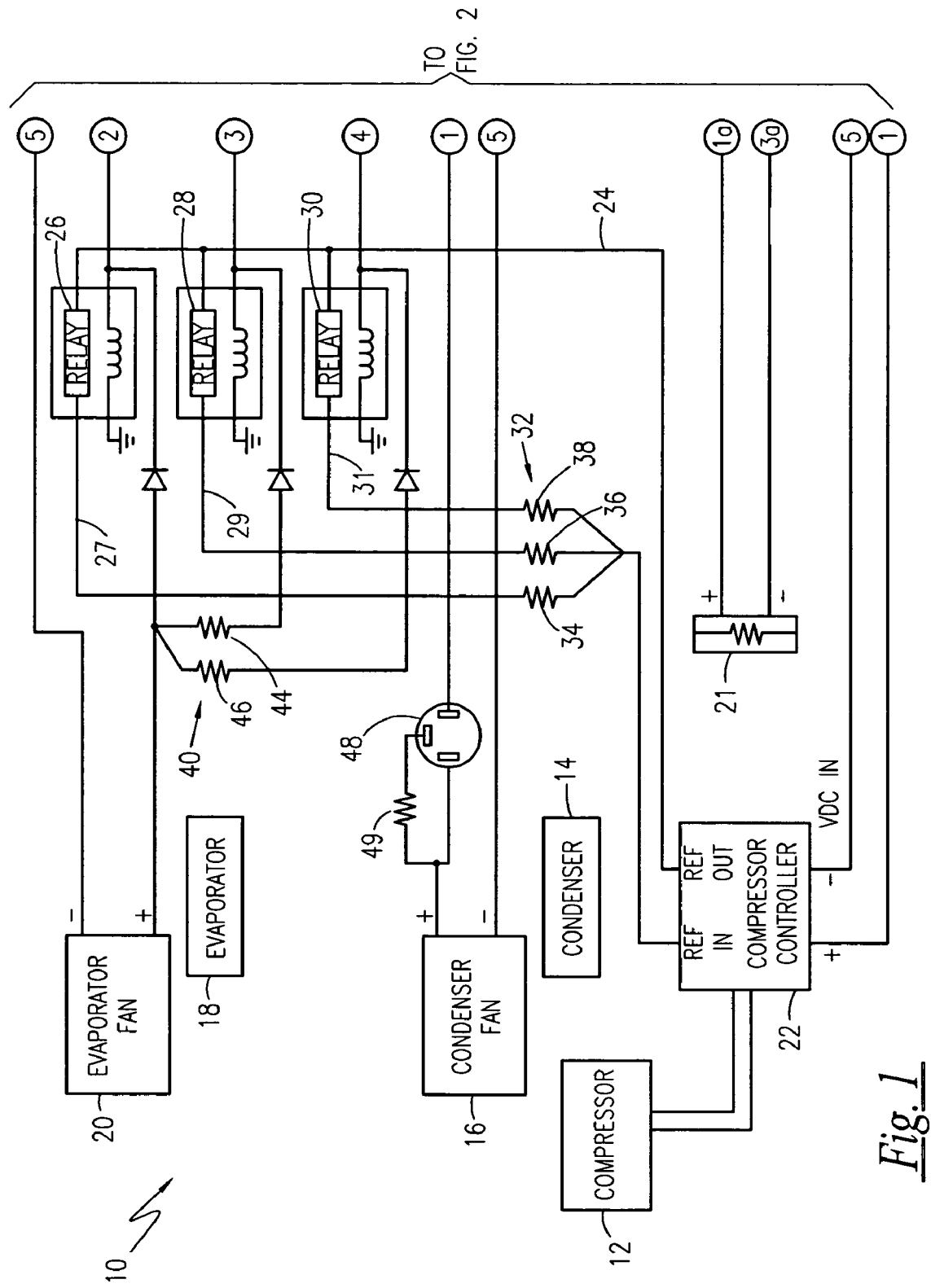
FIG. 1 is a schematic wiring diagram for an environmental-control unit of an HVAC system according to an example embodiment of the invention.

Referring now to the drawings, FIG. 1 is a schematic wiring diagram for a variable-speed environmental-control unit 10 (hereinafter environmental-control unit), which includes a variable-speed compressor 12, a condenser 14, a variable-speed condenser fan 16, an evaporator 18 and a variable-speed evaporator fan 20. The environmental-control unit 10 may further include an optional electric heater 21. In order to increase the efficiency of the environmental-control unit 10 and increase the operating capacity of a DC-power system 60, shown in FIG. 3, the speeds of the variable-speed compressor 12, the variable-speed condenser fan 16 and the variable-speed evaporator fan 20 can be varied based on a function of the temperature inside the mobile unit and of the size of the environment to be controlled. Thus, the variable-speed compressor 12 and the variable-speed evaporator fan 20 will operate at optimum speeds suitable for the application, thereby increasing the capacity of the DC-power system 60. Further, varying the speed of the variable-speed condenser fan 16 helps to assure that the head pressure of the refrigerant used in the variable-speed-environmental-control unit 10 operates within an acceptable operating pressure over a given range of temperatures."

Still referring to FIG. 1, the wiring diagram further includes a speed-control circuit 24 for the variable-speed compressor 12 and the variable-speed evaporator fan 20. The speed-control circuit comprises multiple relays 26, 28, 30, a first voltage divider 32 and a second voltage divider 40. The first voltage divider 32 comprises multiple compressor-speed resistors 34, 36, 38, each having a different value. The second voltage divider 40 comprises multiple evaporator-fan-speed resistors 44, 46, each having a different value. The speed-control circuit 24 includes multiple speed-control sub circuits 27, 29, 31 that comprises a connection between one of the relays 26, 28, 30, one of the compressor-speed resistors 34, 36, 38 and one of the evaporator-fan-speed resistors 44, 46, as shown in FIG. 1. Because each of the compressor-speed resistors 34, 36, 38 and each of the evaporator-fan-speed resistors 44, 46 have a different value the voltage drop over each of the compressor-speed resistors 34, 36, 38 and each of the evaporator-fan-speed resistors 44, 46 is different. Thus, each of the speed-control sub circuit 27, 29, 31 represents a different speed for the variable-speed compressor 12 and the variable-speed evaporator fan 20. For example, if the first relay 26 is energized, the variable-speed compressor 12 and the variable-speed evaporator fan 20 will operate at a first speed. If the second relay 28 is energized, the variable-speed compressor 12 and the variable-speed evaporator fan 20 will operate at a second speed. If the third relay 30 is energized, the variable-speed compressor 12 and the variable-speed evaporator fan 20 will operate at a third speed. In the embodiment shown in FIG. 1, speed-control sub circuit 27, represents a high speed, speed-control sub circuit 29 represents a medium speed and speed-control sub circuit 31 represents a low speed. It should be noted that the first, second and third speeds of the variable-speed compressor 12 and the evaporator fan 20 are not necessarily equal. In other words, the first, second and third speed of the variable-speed compressor 12 may differ from the first, second and third speed of the variable-speed evaporator fan 20. It should also be noted that the variable-speed compressor 12 and the variable-speed evaporator fan 20 are not limited to three speeds. The variable-speed compressor 12 and the variable-speed evaporator fan 20 can be modified to operate at any desired number of speeds by, for example, altering the number of resistors and/or relays provided in the speed-control circuit 24. Thus, the wiring diagram of FIG. 1 is not intended to limit the scope of the invention and is only for illustrative purposes.

Still referring to FIG. 1, a compressor controller 22 is connected to the variable-speed compressor 12 and to the speed-control circuit 24. The compressor controller 22 and the speed-control circuit 24 communicate to control the speed of the variable-speed compressor 12. During operation of the HVAC system the compressor controller 22 generates a reference-out signal, for example 0-10V. The reference-out signal flows through one of the speed-control sub circuits 27, 29, 31, which adjusts the reference-out signal and sends it back to the compressor controller 22 as a reference-in signal. The compressor controller 22 processes the reference-in signal and controls the speed of the variable-speed compressor 12 based on the voltage of the reference-in signal.

Still referring to FIG. 1, a discharge-line-temperature sensor 48 and a condenser-fan-speed resistor 49 are provided to control the speed of the variable-speed condenser fan 16. The discharge-line temperature sensor 48 is arranged to sense the temperature of a discharge line (not shown) of the condenser 14. When the temperature of the discharge line is below a predetermined temperature, indicating that the temperature of the condenser 14 is acceptable, current will flow through the condenser-fan-speed resistor 49, thus, decreasing the voltage to the variable-speed condenser fan 16 thereby decreasing the speed. When the temperature of the discharge line is above the predetermined temperature, indicating that the temperature of the condenser 14 is not acceptable, current will not flow through the condenser-fan-speed resistor 49, thus, increasing the voltage to the variable-speed condenser fan 16, which increases the speed of the variable speed condenser fan 16 thereby cooling the condenser 14 more quickly.

Figure 2:
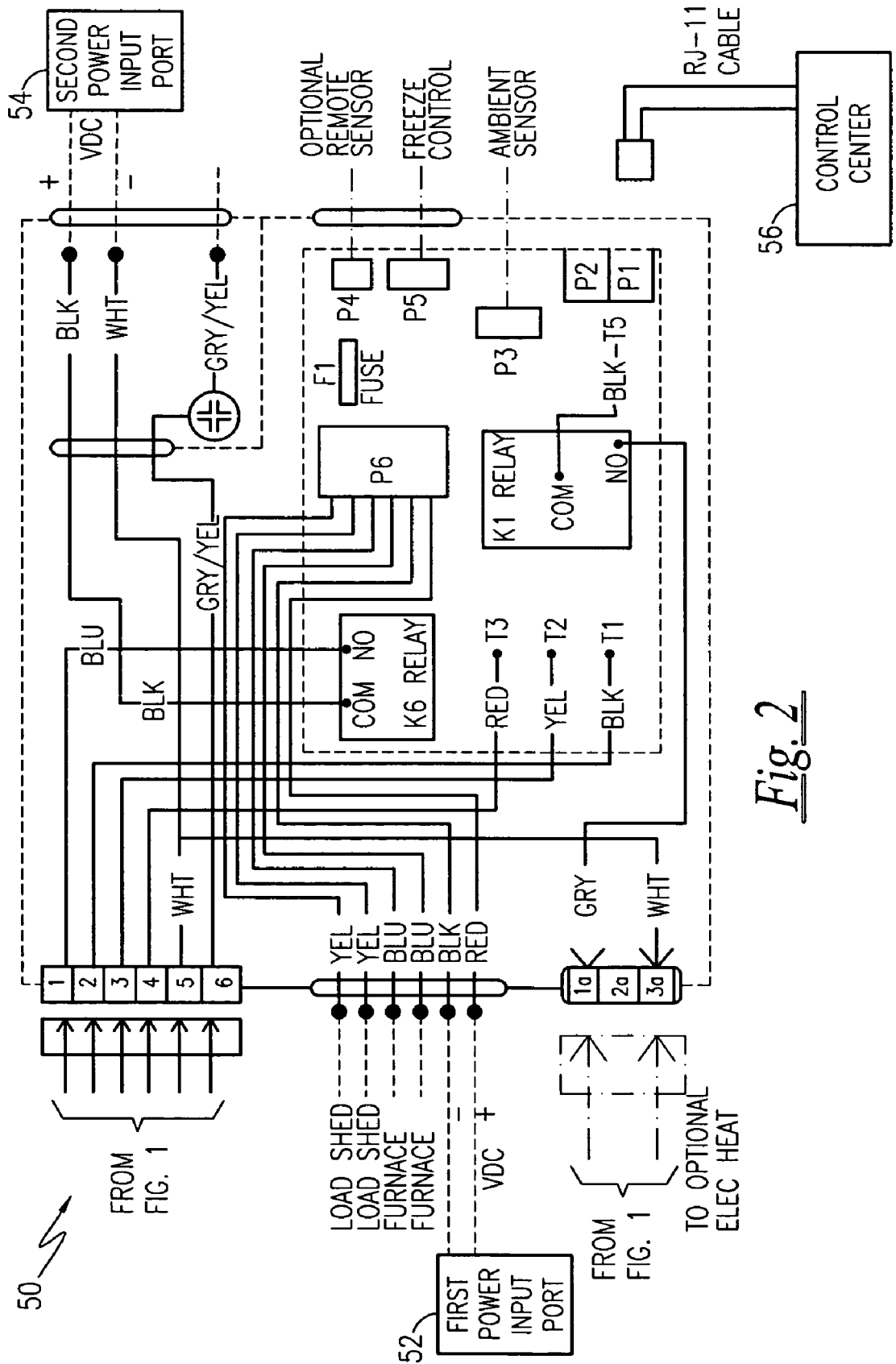
FIG. 2 is a schematic wiring diagram for a controller for the HVAC system of FIG. 1.

FIG. 2 is a schematic wiring diagram for a controller 50 that controls the operation of the environmental-control unit 10. The controller in FIG. 2 is shown by way of example. Any suitable type of controller known in the art may be used according to the invention. As shown, the controller 50 includes multiple terminal connections 1-6. Terminal connection 1 is a power connection and terminal connection 5 is a common connection. Terminal connections 2-4 are reference signal connections to the environmental-control unit 10. The controller 50 further comprises a first power-input port 52 and a second power-input port 54. The DC-power system 60 supplies power to both the first and second power-input ports 52, 54. Power delivered to the first power-input port 52 powers the controller 50 itself, and power delivered to the second power-input port 54 supplies power to the environmental-control unit 10, as described below. FIG. 2 further shows a control center 56, which can be connected to the controller 50, via port P1 or port P2, which are schematically illustrated. The control center 56 is an operator interface, which allows the operator to communicate with and control the HVAC system. One or more control centers 56 may be provided remotely from the controller 50 within the controlled-environmental space of the mobile unit or in another suitable location.

Figure 3:
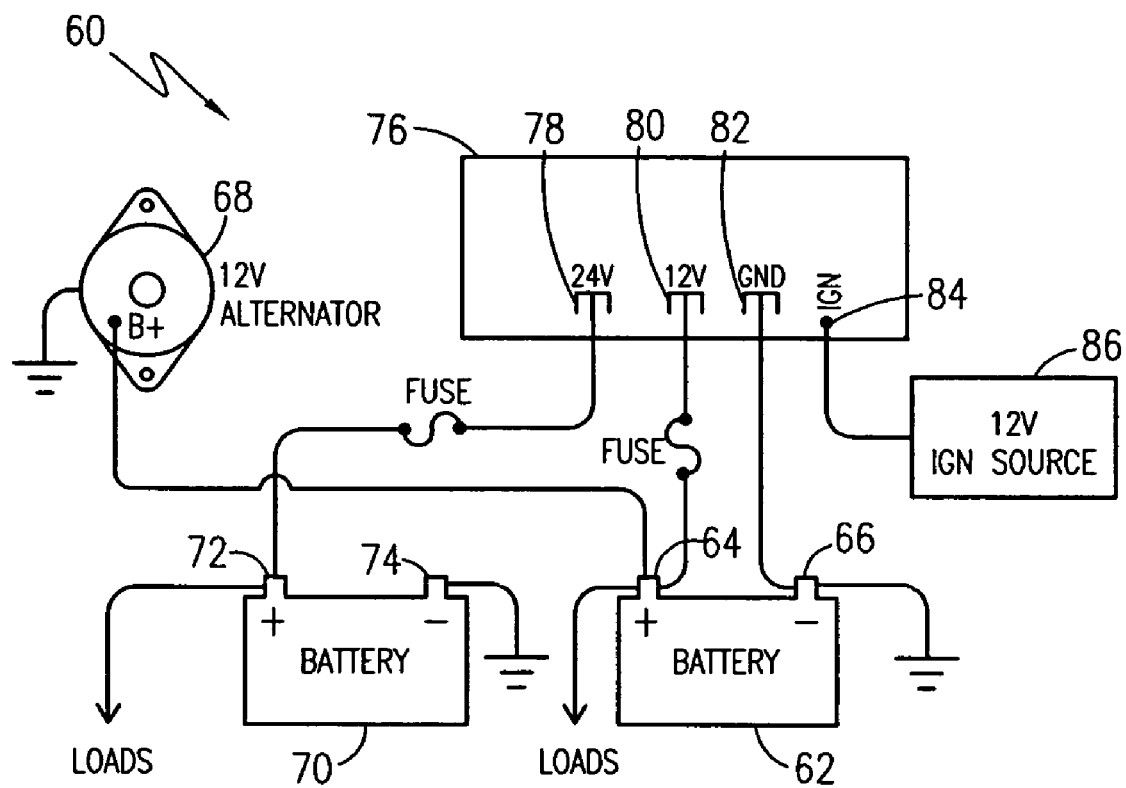
FIG. 3 is a schematic wiring diagram for a DC-power system according to an example embodiment of the invention.

FIG. 3 shows a typical wiring diagram for the DC-power system 60 that supplies power to the environmental-control unit 10. The DC-power system 60 comprises a first DC-power source 62, an alternator 68, a second DC-power source 70 and a converter 76. The first DC-power source 62 may be a starting battery used to start the mobile unit's engine and may comprise either a single battery or, alternatively, multiple batteries. The first DC-power source 62 may also operate the mobile unit's environmental-control unit 10 while the mobile unit's engine is operational. The first DC-power source 62 further includes a positive terminal 64 and a negative terminal 66 that is connected to ground. The alternator 68, which charges the first battery 62 during operation of the mobile unit's engine, is connected to the positive terminal 64 of the first DC-power source 62. The second DC-power source 70 further includes a positive terminal 72 and a negative terminal 74 and may comprise either a single battery or multiple batteries. The second DC-power source 70, which is typically referred to as a house battery, provides DC power to the environmental-control unit 10 when the mobile unit's engine is not operational. The amount of power the second DC-power source 70 can provide to the environmental-control unit 10 can range, for example, from 12V to 150V. Because the thermal output (BTU's) is a function of the incoming voltage, increasing the size of the second DC-power source 70 will increase the BTU output. Thus, the size of the second DC-power source 70 can be selected to provide the amount of deliverable BTU's required for a particular application.

Still referring to FIG. 3, the converter 76 is connected the first and second DC-power sources 62, 70 and provides a step-up voltage to charge the second DC-power source 70. The converter 76 comprises multiple terminals, including a 24V output terminal 78 connected to the positive terminal 72 of the second DC-power source 70, a 12V output terminal 80 connected to the positive terminal 62 of the first DC-power source 62, and a ground terminal 82 connected to ground. The converter 76 further includes an ignition terminal 84 connected to a 12V ignition source 86. When the ignition terminal 84 receives a voltage from the 12V ignition source 86 the converter 76 will activate. When activated, the converter 76 receives a first voltage, for example 12V, from the first DC-power source 62 and converts it to a second voltage, for example 24V. The converter 76 then delivers the second voltage to the second DC-power source 70, thereby charging the second DC-power source 70 while the mobile unit's engine is operational and the first DC-power source is being charged by the alternator 68. Conversely, when the voltage to the ignition terminal 84 is removed, the converter 76 is deactivated and interrupts the power flow between the first DC-power source 62 and the second DC-power source 70. Therefore, when the second DC-power source 70 is in operation without the mobile unit's engine running, the first DC-power source 62 is prevented from discharging through the second DC-power source 70, which would render the mobile unit inoperable.

Referring to FIGS. 1 and 2, operation of the HVAC system will now be described. When the operator enters a command into the control center 56, the command is communicated to the controller 50. The controller 50 processes the command and sends a signal to the environmental-control unit 10 through one of the terminal connections 2, 3 or 4. The signal sent through one of the terminal connections 2, 3 or 4 will energize a corresponding one of the first relay 26, the second relay 28 or the third relay 30. As mentioned above, the compressor controller 22 generates a reference-out signal for example, 0-10V. The reference-out signal will flow through the energized relay 26, 28, or 30, then through a corresponding compressor-speed resistor 34, 36, or 38 and finally back to the compressor controller 22 as a reference-in signal. Because each compressor-speed resistor 34, 36, 38 has a different value, the voltage drop over each resistor will be different. Therefore, the reference-in signal seen at the compressor controller 22 will vary depending on which relay 26, 28, 30 is energized. The compressor controller 22 processes the reference-in signal and controls the speed of the variable-speed compressor 12 based on the value of the reference-in signal. For example, a reference-in signal of 8V may correspond to a high speed, a reference-in signal of 5V may correspond to a medium speed and a reference-in signal of 3V may correspond to a low speed.

Still referring to FIG. 1, at the same time one of the relays 26, 28, or 30 is energized, the variable-speed evaporator fan 20 will turn on at a speed corresponding to the energized relay. For example, when relay 26 is energized by a signal sent to terminal connection 2, maximum voltage is delivered to the variable-speed evaporator fan 20 because there is no speed resistor between terminal connection 2 and the variable-speed evaporator fan 20. Thus, the variable-speed evaporator fan 20 will operate at a first speed. As mentioned above, the evaporator-fan-speed resistors 44, 46 each have a different value. Thus, when relay 28 is energized by a signal sent to terminal connection 3, a voltage drop will occur over the evaporator-fan-speed resistor 44, which supplies a decreased the voltage to the variable-speed evaporator fan 20 causing the variable-speed evaporator fan 20 to operate at a second speed. Further, when relay 30 is energized by a signal sent to terminal connection 4, a different voltage drop will occur over the evaporator-fan-speed resistor 46, which supplies a different decreased voltage to the variable-speed evaporator fan 20 causing the variable-speed evaporator fan 20 to operate at a third speed. In the embodiment shown in FIG. 1, the first speed is high speed, the second speed is medium speed and the third speed is low speed. It should be noted that the particular details of FIG. 1 are shown by way of example, and that the first, second and third speeds may be set to any suitable speeds.

According to the disclosed embodiment, the operator has the option of either manually entering the desired speed of the environmental-control unit 10 or allowing the HVAC system to automatically control the speed based on the temperature inside the mobile unit.

While specific embodiments of the invention have been described and illustrated, it is to be understood that these embodiments are provided by way of example only and that the invention is not to be construed as being limited thereto but only by proper scope of the following claims.

What is claimed is:

1. A variable-speed HVAC system for a mobile unit having an engine, the variable-speed HVAC system comprising:
    a variable-speed compressor;
    a variable-speed evaporator fan;
    a controller for controlling the operation of the variable-speed HVAC system;
    a first DC-power source having a DC battery to start the mobile unit's engine;
    a second DC-power source having a DC battery connected to the first DC-power source;
    a speed-control circuit having a plurality of speed-control sub circuits;
    a condenser having a discharge line;
    a variable-speed condenser fan; and
    a temperature sensor connected to the variable-speed condenser fan;
    wherein the second DC-power source provides DC power to the variable-speed compressor and the variable-speed evaporator fan when the mobile unit's engine is not operating,
    wherein each speed-control sub circuit limits each speed of the variable-speed compressor to a specific speed of the variable-speed evaporator fan,
    wherein the temperature sensor measures a temperature of the condenser discharge line, and
    wherein if the measured temperature of the condenser discharge line is below a predetermined temperature then the variable-speed condenser fan will operate at a first speed and if the temperature of the condenser discharge line is above the predetermined temperature, then the variable-speed condenser fan will operate at a second speed that is lower than the first speed.

2. The variable-speed HVAC system of claim 1 further comprising a compressor controller connected to the variable-speed compressor and to the speed-control circuit, and wherein the compressor controller sends a reference-out signal to the speed-control circuit and receives a reference-in signal from the speed-control circuit.

3. The variable-speed HVAC system of claim 2, wherein the compressor controller controls the speed of the variable-speed compressor based on a value of the reference-in signal.

4. The variable-speed HVAC system of claim 3 further comprising a control center located in a controlled-environmental space of the mobile unit;
    wherein the control center is connected to the controller, and
    wherein the control center is an operator interface to allow the operator to communicate with and control the HVAC system.

5. The variable-speed HVAC system of claim 4 further comprising a converter connected to the first and second DC-power sources, the converter comprising an ignition terminal connected to a voltage source that supplies voltage when the mobile unit's engine is operating, wherein the converter is activated when the voltage source supplies voltage to the ignition terminal and is deactivated when the voltage source does not supply a voltage to the ignition terminal.

6. The variable-speed HVAC system of claim 5, wherein the converter charges the second DC-power source when the converter is activated, and wherein the converter interrupts the power connection between the first DC-power source and the second DC-power source when the converter is deactivated.

* * * * *